(12) United States Patent
Gutjahr et al.

(10) Patent No.: US 9,195,535 B2
(45) Date of Patent: Nov. 24, 2015

(54) HOTSPOT IDENTIFICATION

(71) Applicant: Hewlett-Packard Development Company, L.P., Houston, TX (US)

(72) Inventors: Bernd Gutjahr, Ostelsheim (DE); Christian Schaefer, Kirchentellinsfurt (DE); Klaus Baumecker, Bondorf (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 284 days.

(21) Appl. No.: 13/873,680

(22) Filed: Apr. 30, 2013

(65) Prior Publication Data

US 2014/0325290 A1    Oct. 30, 2014

(51) Int. Cl.
*G06F 11/00* (2006.01)
*G06F 11/07* (2006.01)

(52) U.S. Cl.
CPC .......... *G06F 11/079* (2013.01); *G06F 11/0793* (2013.01)

(58) Field of Classification Search
CPC .......................... G06F 11/0793; G06F 11/0709
USPC .......................................................... 714/48
See application file for complete search history.

(56) References Cited

U.S. PATENT DOCUMENTS

| | | | |
|---|---|---|---|
| 7,379,061 B2 | 5/2008 | Castonguay et al. | |
| 7,649,845 B2 * | 1/2010 | Mukherjee | 370/235 |
| 7,711,987 B2 | 5/2010 | Agarwal et al. | |
| 8,219,112 B1 * | 7/2012 | Youssef et al. | 455/456.1 |
| 8,301,613 B2 | 10/2012 | Grabarnik et al. | |
| 8,601,419 B1 * | 12/2013 | Chiang et al. | 716/112 |
| 8,935,643 B2 * | 1/2015 | Salem et al. | 716/112 |
| 2002/0111755 A1 | 8/2002 | Valadarsky et al. | |
| 2010/0324878 A1 * | 12/2010 | Lee et al. | 703/14 |
| 2011/0013569 A1 * | 1/2011 | Scherzer et al. | 370/329 |
| 2012/0034922 A1 * | 2/2012 | Jones et al. | 455/438 |
| 2012/0236733 A1 * | 9/2012 | Deu-Ngoc et al. | 370/252 |
| 2014/0358830 A1 * | 12/2014 | Chiang et al. | 706/12 |

OTHER PUBLICATIONS

Yang, et al., "Hotspot Diagnosis on Logical Level", 7th International Conference on Network and Service Management 2011, Paris, France, Oct. 24-28, 2011, 5 pages.
Unknown., "CA Configuration Automation", Retrieved from http://www.ca.com/~/media/Files/ProductBriefs/ca-configuration-automation-12-5-ps.pdf, Jun. 2011, 8 pages.
Hitachi Data Systems., "The Quick Path for Fault Identification", Retrieved from http://www.hds.com/assets/pdf/hitachi-white-paper-the-quick-path-for-fault-identification.pdf, Apr. 2012, 13 pages.

* cited by examiner

*Primary Examiner* — Amine Riad
(74) *Attorney, Agent, or Firm* — Brooks, Cameron & Huebsch, PLLC (57) ABSTRACT

Hotspot identification can include receiving data indicating a plurality of reported events each associated with a respective number of configuration items (CIs) of a plurality of CIs and receiving data indicating a topological dependency of each of the plurality of CIs. Hotspot identification can include assigning a weight to each of the respective number of CIs, assigning a weight to CIs of the plurality of CIs having a topological dependency from the respective number of CIs, and identifying the hotspot having a weight assigned thereto that satisfies a hotspot weight threshold.

12 Claims, 4 Drawing Sheets

HOTSPOT IDENTIFICATION

BACKGROUND

Information technology (IT) can refer to the use of computing devices to manage information. IT management can include managing a variety of areas, such as computing devices, computer software, information systems, computer hardware, and processes related thereto. Issues in IT systems can cause reduced response times or even downtime in IT services.

DETAILED DESCRIPTION

Information technology (IT) systems can include a number, for example, hundreds, of IT components. IT components can include, but are not limited to computing devices, computer software, information systems, computer hardware, and processes related thereto. When an issue occurs with an IT component it can affect other IT components of the IT system. For example, an issue with an IT component can cause that IT component and/or other IT components to provide slower response times or even cause downtime. Slower response times and/or downtime, along with other effects that an issue with an IT component can cause, are undesirable. Therefore, it is beneficial to resolve issues with IT components quickly.

Some previous approaches attempting to resolve issues with IT components may rely upon manual identification (e.g., identification by IT administrators) of IT components and/or may be limited to known issues (e.g., a previously encountered issue). However, such approaches may be ineffective and/or time consuming; especially in the case of evolving IT systems (e.g., updated hardware and/or software) and/or issues not previously encountered.

Additionally, as the number of IT components increases, so too does the complexity of identifying IT components associated with the issue. For example, a datacenter can have a plurality of servers (e.g., web servers, application servers, and/or a data server, among other servers) that can be, for instance, a thousand servers among other IT components of the datacenter. Identifying IT components associated with the issue for such a data center can be overly expensive (e.g., time-consuming) and/or difficult due to the changing nature of an environment (e.g., addition and/or removal of servers from the plurality of servers or shifting of the client demands) and/or the sheer size of the data center itself.

Moreover, some previous approaches rely upon confirmation (e.g., manual and/or automated real-time monitoring/testing of particular IT component(s)) of a root cause prior to attempting to resolve the issue. Such approaches can markedly increase the expense (e.g., time) to remediate (e.g., resolve) the issue and/or may not account for a topography (e.g., topological dependencies between the IT components) of the IT components, let alone changes to the topography.

In contrast, examples of the present disclosure include methods, systems, and computer-readable media with executable instructions stored thereon for hotspot identification. A hotspot can be a configuration item (CI). The CI can be associated with a reported event or associated with another CI that is associated with the reported event. A CI refers to software, hardware, and/or network connections, for example, those associated with a business unit of a business organization. For instance, CIs can include nodes, databases, and processors, among other network connections.

The hotspot may or may not be subsequently confirmed to be and/or contain an IT component that is a root cause of an event. That is, in some examples, a root cause of the event (e.g., a particular CI previously identified as a hotspot) can be diagnosed subsequent to a remediation being performed. For instance, remediation of an identified hotspot (e.g., a rack of a server) can include repairing the identified hotspot (e.g., a CI) and/or replacement (e.g., with a similar CI) and service can be resumed, for instance without confirming a root cause (e.g., a defective IT component of a plurality of IT components within the rack identified as the hotspot). Accordingly, identification of a hotspot, in contrast to previous approaches, can enable timely remediation of a reported event.

Moreover, the present disclosure can identify hotspots without the use of predefined rules and/or without monitoring (e.g., without real time monitoring particular CIs of the plurality of CIs) to determine if rules (e.g., predetermined rules) are satisfied. The lack of rules based CI servicing provides numerous advantages over previous rules based approaches, such as elimination of updates to such rules attempting to account for changing conditions (e.g., changes in a total number of the plurality of CIs associated with the predetermined rules). Advantageously, hotspot identification, as described herein, can promote timely and/or cost efficient resolution of reported events, among other advantages over previous approaches. For example, a hotspot can be identified and/or remediated without specifically identifying and/or confirming a root cause. Examples of confirming include performing tests (e.g., simulations) to confirm a CI as a root cause of a reported event.

Figure 1:
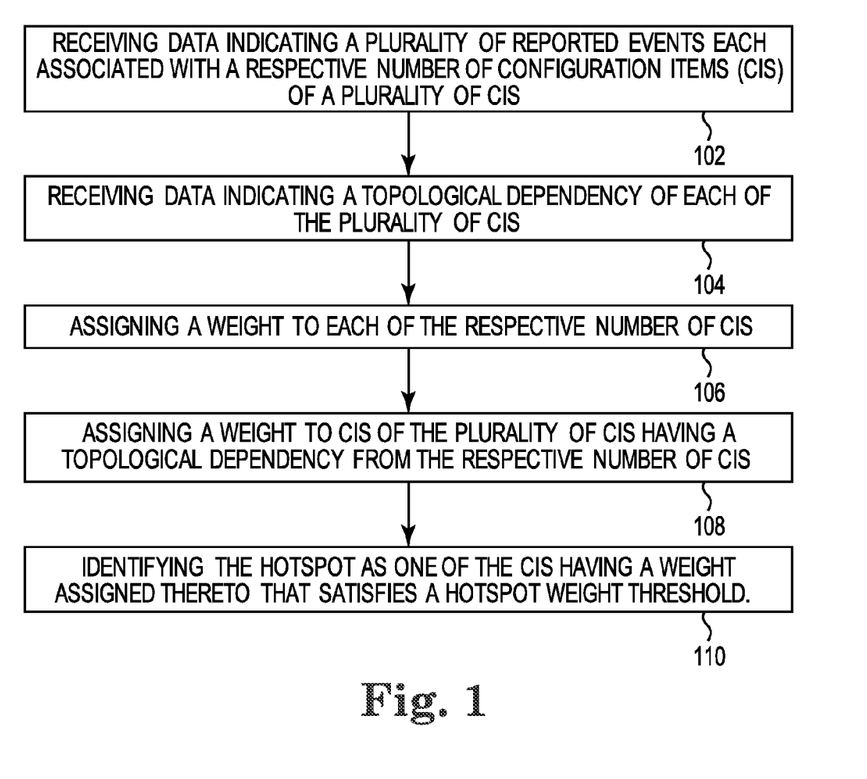
FIG. 1 illustrates a block diagram of an example of a method for hotspot identification according to the present disclosure.

FIG. 1 illustrates a block diagram of an example of a method for hotspot identification according to the present disclosure. The example method 100 for hotspot identification can utilize a processing resource to execute instructions stored on a non-transitory medium. For instance, the method 100 can include receiving data indicating a plurality of reported events each associated with a respective number of CIs of a plurality of CIs, receiving data indicating a topological dependency of each of the plurality of CIs, and assigning a weight to each of the respective number of CIs, as shown in blocks 102, 104, and 106 of FIG. 1, respectively. In some examples, the method can include calculating a weight as a product of a confidence factor and a coverage factor, as described herein.

A CI, for example an application, can be stored in a database, as described herein and/or installed on a server (e.g., coupled to a server and/or stored on integrated memory, such as a hard drive, of the server). Example databases include a central configuration management database (CMDB) and/or a universal configuration management database (uCMDB), among other databases. A uCMDB, for example, can store the plurality of CIs and/or information (e.g., descriptions of reported events and/or organizational preferences, among other information) relating to the plurality of CIs.

A plurality of CIs can be topologically dependent on a CI of the plurality of CIs. Such dependency can, for instance, be between at least two CIs of the plurality of CIs, among other topological dependencies. Queries can be defined to select the topological dependencies from the database (e.g., a uCMDB database). Such topological dependencies can be used for hotspot identification (e.g., determining a plurality of potential hotspots common to a plurality of reported events), as described herein.

A reported event (e.g., an issue) can be reported due to a service and/or application that does not satisfy a performance baseline. For example, the reported event can include an IT event (e.g., detection of IT issues), a manufacturing event (e.g., detection of manufacturing issues), and a system event (e.g., detection of system issues) reported, among other events. A reported event can include a description of the reported event and/or can identify a CI (e.g., a respective number of CIs) associated with the reported event, for example, by providing an identifier associated with the CI. In some examples, the reported event can include identifiers of a plurality of CIs that depend (e.g., can be impacted) from the CI associated with the reported event. Reported events and/or indentified CI associated therewith can, for example, be stored in a database, such as those described herein, and/or an event archive. An event archive, for instance, can include a number of management databases (e.g., event database and lock file) and can include historical management event data. For instance, historical management event data (e.g., electronic data) can include management event data within a threshold period of time (e.g., week, month, and year).

The method 100 can include assigning a weight to CIs of the plurality of CIs having a topological dependency from the respective number of CIs and identifying the hotspot as one of the CIs having a weight assigned thereto that satisfies a hotspot weight threshold, as shown in blocks 108 and 110 of FIG. 1, respectively. A topological dependency can refer to a CI of the plurality of CIs depending from or upon a different CI of the plurality of CIs. That is, a CI that is dependent may not be an atomic and/or independent software item and/or code. For instance, a functionality of a CI can be dependent on (e.g., a function performed by) another CI. For example, when conducting a transaction having an anticipated outcome a plurality of CIs depending upon each other may be implemented in an effort to achieve the anticipated outcome. However, should the anticipated outcome not be achieved the transaction can be flagged and/or reported as an event.

As described herein, an event (e.g., a reported event) refers to a deviation (e.g., failure to meet and/or maintain a performance metric specific by a service level agreement) from a desired outcome of a transaction. Such events can be automatically detected, for example, by, a number of servers operating as management servers. Such servers can, in some examples, forward events to a particular server, for example, a primary management server. The servers, for example, the primary management server can transmit the events to a database for storage of the events. The servers can independently handle events and/or can transmit events to another server. That is, the servers are in contact with each other. Such transmission to another server can promote "cross domain" root cause identification/confirmation and/or specialization of a given server. Such specialization can relate to a particular application and/or event type, among other possible specializations. For example, a server managing a particular application may be interested in reported events from a CI managed by a different server, for instance, reported events involving the particular application. That is, each server can monitor CIs of a network topology, for example, each server monitoring respective portions of the network topology. The network topology, for example, including topological dependencies of the plurality of CIs can be depicted graphically.

Figure 2A:
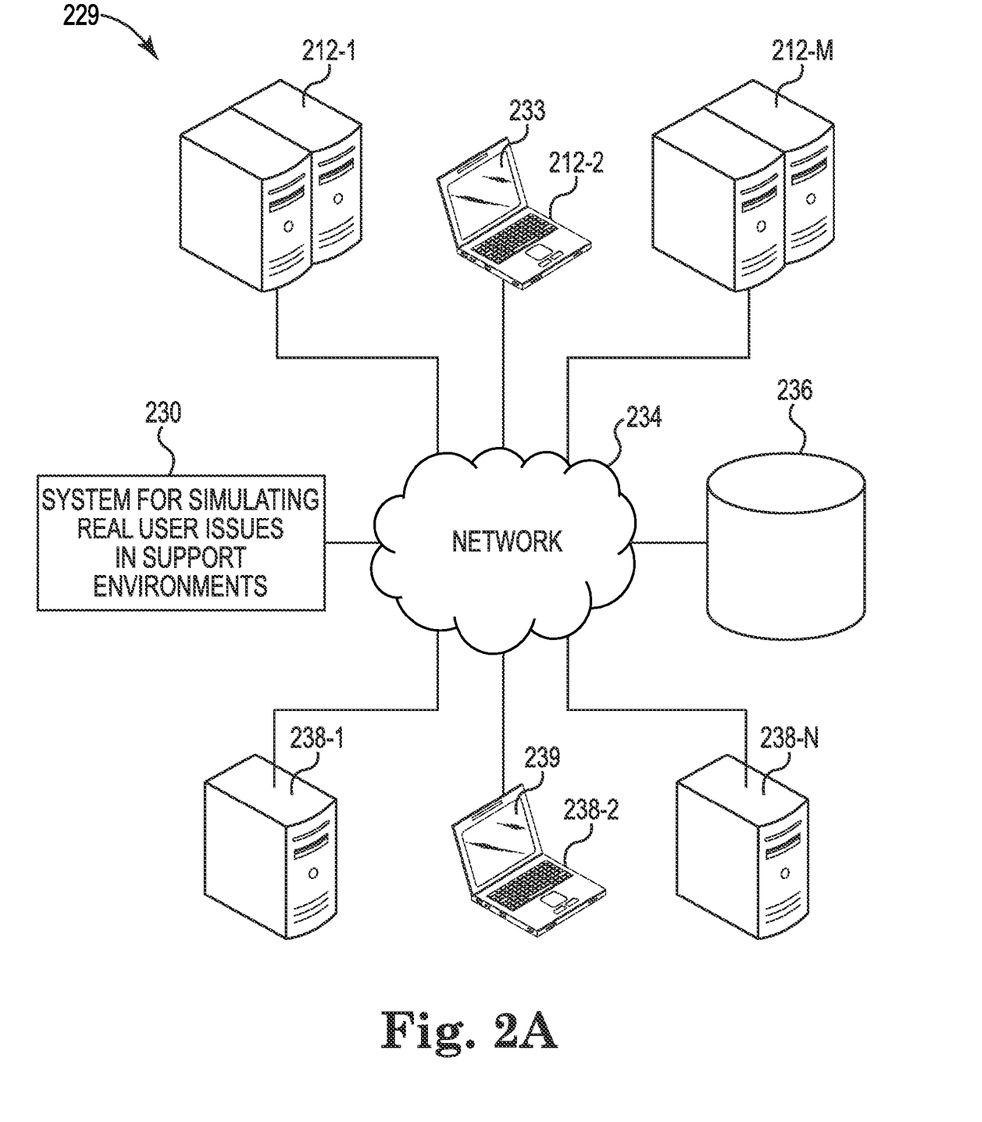
FIG. 2A illustrates an example of an environment in which various examples can be implemented for hotspot identification according to the present disclosure.

FIG. 2A illustrates an example of an environment in which various examples can be implemented for hotspot identification according to the present disclosure. The environment 229 is shown to include a system for hotspot identification 230, a plurality of CIs 212-1, 212-2, . . . , 212-M, a plurality of user devices 238-1, 238-2, . . . , 238-N, and a network 234. The plurality of CIs 212-1, 212-2, . . . , 212-M, can be analogous to those discussed with respect to FIG. 2B.

The system for hotspot identification (e.g., the system 230), as described herein, represents a combination of hardware and programming for hotspots. For example, as illustrated in FIG. 2A, data (e.g., stored electronic data) can be received (e.g., received at the plurality of user devices 238-1, . . . , 238-N) from a storage device 236 (e.g., a database and/or an event archive). The plurality of user devices 238-1, . . . , 238-N represent a computing devices to receive stored data (e.g., electronic data) having browsers or other applications to communicate such data (e.g., data associated with reported events and/or topological dependencies) and/or to identify hotspots using the stored data (e.g., a stored topological dependency). In some examples, the plurality of user devices 238-1, . . . , 238-N can include a graphical display (e.g., a graphical user interface 239). Similarly, in some examples, the plurality of CIs 212-1, . . . , 212-M can include a graphical display (e.g., a graphical user interface 233) suitable for display of electronic data.

Network 234 represents a cable, wireless, fiber optic, or remote connections via a telecommunication link, an infrared link, a radio frequency link, and/or any other connectors or systems that provide electronic communication. The network 234 can include a link to, for example, an intranet, the Internet, or a combination of both, among other communication interfaces. The network 234 can also include intermediate proxies, for example, an intermediate proxy server (not shown), routers, switches, load balancers, and the like.

According to some examples of the present disclosure, instead of recreating (e.g., generating) network traffic between a "real" user from a "real" source server, a reported event can be simulated in a support environment. For instance a simulation can, for example, use the stored data for a database and/or an event archive. Such a simulation can promote identification of a plurality of possibly impacted CIs (PICs) that can possibly be impacted by a CI associated with a given simulated event. For example, the PICs can include all CIs depending from a given CI associated with a given simulated reported event. Simulation can include simulating a suitable total number of the plurality of reported events (e.g., 1000 reported events) and/or a suitable total number of the plurality of CIs (e.g., 1000 CIs).

The simulation can include displaying a visual representation of the simulation including the suitable total number of the plurality of reported events, the suitable total number of the plurality of CIs, and/or the resultant PICs via the graphical user interface 239 of the user devices 238-1, . . . , 238-N. The display can readily enable a support personal (e.g., an IT administrator) to adjust various parameters (e.g., a hotspot weight threshold) utilized for hotspot identification to ensure proper identification (e.g., accurate and/or identification as intended by the support personal) of the hotspots. For instance, such a display can include a simulation of a graph (e.g., a digital representation) similar to graphs for indentifying hotspots enabling comparison therebetween to ensure proper identification of hotspots (e.g., that each of the plurality of CIs and/or a desired number of CIs are graphically represented in a graph used for indentifying hotspots).

Figure 2B:
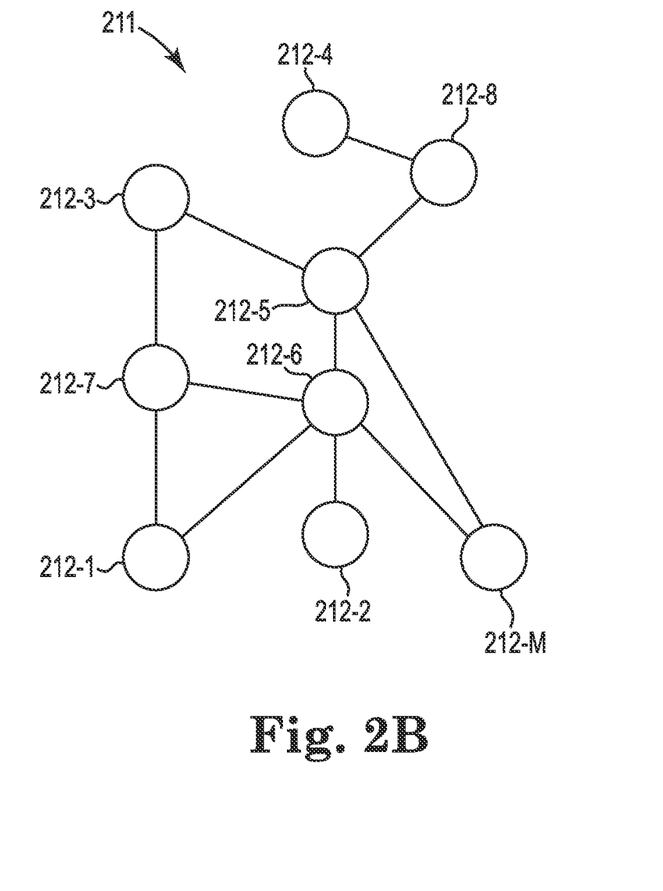
FIG. 2B illustrates an example of a graph for hotspot identification according to the present disclosure.

FIG. 2B illustrates an example of a graph for hotspot identification according to the present disclosure. Such a graph 211 (e.g., an acyclic graph) can represent (e.g., digitally represent) a plurality of CIs (e.g., a topological hierarchy of the plurality of CIs). The plurality of CIs can be existing CIs (e.g., previously discovered and stored in a database) and/or discovered CIs (e.g., by a discovery IT component and subsequently stored in a database). Discovery of the CIs can occur periodically (e.g., at a regularly occurring times and/or time intervals) and/or upon request (e.g., initiated by an IT administrator), for instance, requested by a business service structure to which a CI relates. For instance, the business service structure can represent a plurality of CIs associated with a particular segment (e.g., a department) of a business. However, the disclosure is not so limited. That is, the graph 211 can represent CIs from multiple business segments.

As illustrated in FIG. 2B, the graph 211 can include a plurality of CIs 212-1, 212-2, 212-3, 212-4, 212-5, 212-7, 212-8, 212-M. In various examples, at least some of the plurality of CIs can be topologically dependent upon one another. As illustrated in FIG. 2B, a reported event (not shown) can include a plurality of CIs (e.g., CIs 212-2, 212-3, etc) having a topological dependency upon a CI, for instance, a respective CI (e.g., CI 212-1) associated with the reported event. The respective CIs and/or the plurality CIs having a topological dependency therefrom can have a weight assigned thereto, as described herein. A weight can be assigned to a CI in response to receipt of the plurality of reported events. That is, the CI reported in an event (e.g., the respective CI) and/or the plurality of CIs depending upon and/or from the reported CI can each have a weight assigned thereto. For example, a weight can be assigned to a CI from which a given CI in the reported event depends upon (e.g., directly or indirectly depends upon).

The CIs assigned a weight can, for example, include CIs common to the plurality of events. As described herein, a common CI is a CI of the plurality of CIs associated with two or more of the plurality of events. That is, the common CI can be reported in the event, for example, by including an identifier associated with the common CI in the reported event description and/or identified from the topological dependencies (e.g., a topological dependency from a CI) reported in the event. Such an identifier can include, an Internet Protocol (IP) addresses, a domain name system (DNS) name, and/or a uniform resource locator (URL), among other identifiers. For example, an alpha numerical identifier "x128jav" can be associated with a given CI of the plurality of CIs. In such an example, should the identifier "x128jav" be reported in two or more events of the plurality of events the identifier can be determined as being common to the two or more reported events (e.g., ten reported events having a common identifier associated therewith). That is, the CI associated with the common identifier can be determined to be a CI common to the two or more reported events. However, the present disclosure is not so limited. For instance, common events can also be determined using the topological hierarchy that depends from a particular CI (e.g., a CI reported in an event). A CI common to the plurality of reported events can be determined from CIs in the plurality of events and/or from the plurality of CIs topologically depending therefrom. Such determination can be performed automatically, for example, utilizing stored data from a database and/or event database.

A weight can be assigned to a CI, for example, a CI common to the plurality of reported events. Assigning can include calculating a product of a coverage factor (e.g., Cv(x)) and a confidence factor (e.g., Cf(x)). For instance, a resultant product of the coverage factor and the confidence factor for a given CI can be assigned to the given CI as a weight.

The coverage factor can be a ratio, for example, a total number of the plurality of CIs that can be impacted by a given CI (e.g., imp (x), as shown in Eq. 2) to a total number of the plurality of CIs reported in the events (e.g., |M|). For instance, the total number of the plurality of CIs that can be impacted by a given CI can include a summation of a number of CIs in the reported event (e.g., each of the impacted CIs can have an identifier associated therewith that is included in the reported event). A cardinality (e.g., a number of times a CI having a particular identifier can appear in a relationship) can, for example, the cardinality can be a 1:1 ratio between a given CI and a total number of the plurality of CIs in the reported events. However, the present disclosure is not so limited. That is, the cardinality can be varied and/or include a cardinality threshold (e.g., an upper limit on a number of times a given CI can appear in the total number of the plurality of CIs reported in the plurality of events). Such cardinality can be implemented using software, logic, and/or hardware (e.g., stored procedure language (SPL)) to place cardinality constraints on the total number of the plurality of CIs reported in the plurality of events. For instance, implementation of a 1:1 ratio can ensure that a given CI having a particular identifier can be included a single time in the total number of the plurality of CIs reported in the reported events.

The confidence factor can be a function, for example, a linear function of the ratio of the total number of the plurality of CIs that can be impacted by a given CI (e.g., imp (x) to a total number of the plurality of CIs that depend from a given CI (e.g., dep(x)). For instance, imp (x) can be less than or equal to (e.g., dep(x). As shown, in Eq. 3, the confidence factor can be, for example, be a cubic root of the ratio of the total number of CIs that can be impacted by a given CI to a total number of the plurality of CIs that depend from a given CI. However, the disclosure is not so limited. That is, the coverage factor and/or confidence factor can be calculated using any suitable function to promote hotspot identification.

$$W(x) = Cv(x) * Cf(x) \qquad \text{(Eq. 1)}$$

$$Cv(x) = \frac{|imp(x)|}{|M|} \qquad \text{(Eq. 2)}$$

$$Cf(x) = \sqrt[3]{\frac{|Imp(x)|}{|dep(x)|}} \qquad \text{(Eq. 3)}$$

The impact of an event is calculated by using the topology information stored in a database (e.g., a uCMDB). The topology contains information about the relationships of events and the business importance of them. Such information can enable calculations, for example, the total number of the plurality of CIs that depend from a given CI (e.g., dep(x)) can be calculated as a function including a set of the total number of the plurality of CIs that depend from a given CI. Such a set can be determined based on the topological dependencies (e.g., using a query). For instance, the total number of the plurality of CIs that depend from a given CI can include all CIs depending from the given CI, irrespective of a reported CI (e.g., irrespective of each of the reported CIs). An example of such a function is shown in Eq. 4.

$$dep(x) = \{x\} \cup \bigcup_{\langle y,x \rangle ET} dep(y) \qquad \text{(Eq. 4)}$$

Additionally, the stored information can enable the calculation of the total number of the plurality of CIs that can be impacted by a given CI e.g., imp (x) can be calculated as a function of a set including the total number of the plurality of CIs that can be impacted by a given CI. Eq. 5 depicts an example of such a function.

$$imp(x) = \{x \mid x \in M\} \cup \bigcup_{\langle y,x \rangle ET} imp(y) \qquad \text{(Eq. 5)}$$

A plurality of potential hotspots common to the plurality of reported events can be determined, for example, as described with respect to FIGS. 2A and 2B. A plurality of potential hotspots can be identified from the plurality of common CIs. For instance, a weight assigned to each of the potential hotspots (e.g., the local maximum) can be compared to a hotspot weight threshold and a hotspot can be identified. In various examples, identifying can include identifying from a plurality of common hotspots, potential hotspots (e.g., a CI, having an assigned weight that is a local maximum with respect to assigned weights of adjacent CIs). Eq. 6 depicts an example of an equation for calculating a local maximum in accordance with the present disclosure.

$$Locmx(x) = \forall \langle x,y \rangle \in T(W(x) \geq W(y) \wedge \text{\textbf{■}} [\forall \langle y,x \rangle \in T(W(y))] \qquad \text{(Eq. 6)}$$

where $C = \{x \mid locmx(x)\}$

As described herein, adjacent CIs can be CIs one hop from each of the potential hotspots according to the dependency. Referring to FIG. 2B, CIs 212-1, 212-3, and 212-6 are adjacent CIs with respect to CI 212-8. That is, the adjacent CIs can be any number of the plurality of CIs being one hop away from a given CI (e.g., a CI having an identifier in a reported event).

The hotspot can be identified from the potential hotspots. For example, a plurality of CIs can each be assigned a weight and a CI having a weight assigned thereto that satisfies (e.g., exceeds) a hotspot weight threshold can be identified as a hotspot. Eq. 7 provides an example equation for hotspot identification.

$$H(\theta) = \forall \langle x,y \rangle \{x \in C \mid W(x) \geq \theta\} \qquad \text{(Eq. 7)}$$

However, the present disclosure is not so limited. That is, a number of CIs of the plurality of CIs can be identified by the event and/or a number of hotspots (e.g., those satisfying the hotspot weight threshold) can be identified from the plurality of CIs having a weight assigned thereto.

In some examples, identifying the hotspot from the potential hotspots common to the reported events can include identification beginning with a potential hotspot of the potential hotspots having comparatively less CIs depending therefrom with respect to the other potential hotspots. For instance, a server can depend from a communication link providing data to the server that sends the data to a storage device including a plurality of racks capable of storing the data. In such an example, identification can begin with a bottom CI, for instance, a rack of the plurality of racks. Such a rack in the example can be a potential hotspot of the potential hotspots having comparatively less CIs depending therefrom (e.g., 0 CIs) with respect to the other potential hotspots (e.g., the storage device from which the plurality of racks depend). A hotspot can be identified (e.g., as the rack), as discussed herein, and/or another hotspot of the plurality of hotspots (e.g., another rack of the plurality of racks) can be analyzed. Attempts to identify a hotspot can continue until all the CIs at a given level (e.g., the plurality of racks at the rack level having the same number of CIs depending therefrom) are analyzed, for instance, identified as a hotspot or identified as not being a hotspot. In some examples, identification of a hotspot can stop the analysis and/or further analysis can continue (e.g., analysis of a CI having a comparatively higher level CIs depending therefrom). Identified hotspots can be assigned a weight as described herein.

Figure 3:
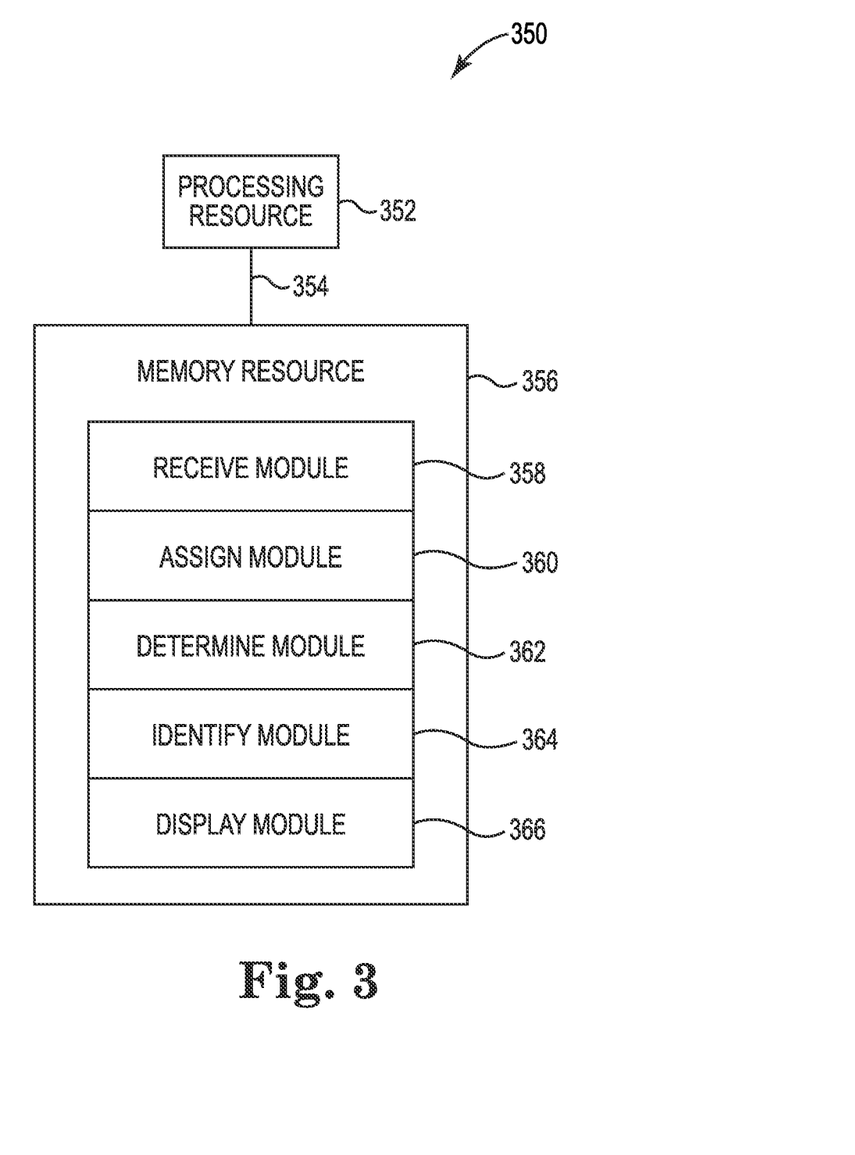
FIG. 3 illustrates a diagram of an example of a computing system for hotspot identification according to the present disclosure.

FIG. 3 illustrates a diagram of an example of a computing system for hotspot identification according to the present disclosure. The computing system 350 can utilize software, hardware, firmware, and/or logic to perform a number of functions.

The computing system 350 can be any combination of hardware and program instructions for hotspot identification. The hardware, for example can include a processing resource 352, a memory resource 356, and/or machine-readable medium (MRM) (e.g., computer-readable medium (CRM), database, etc.). A processing resource 352, as used herein, can include any number of processors capable of executing instructions stored by a memory resource 356. The processing resource 352 may be integrated in a single device or distributed across devices. The processing resource 352 can execute MRI to perform various functions, include the functions described with respect to FIG. 1, FIG. 2A, and FIG. 2B. For example, the processing resource 352 can execute MRI to receive data indicating a plurality of reported events each associated with a respective number of CIs of a plurality of CIs.

The memory resource 356 can be in communication with a processing resource 352. A memory resource 356, as used herein, can include any number of memory components capable of storing instructions that can be executed by processing resource 352. Such memory resource 356 can be a non-transitory MRM. Memory resource 356 may be integrated in a single device or distributed across devices. Further, memory resource 356 may be fully or partially integrated in the same device as processing resource 352 or it may be separate but accessible to that device and processing resource 352. Thus, it is noted that the computing system 350 may be implemented on a user device and/or on a collection of user devices, among other devices and/or collections of devices. The memory resource 356, as used herein, can include volatile and/or non-volatile memory. Volatile memory can include memory that depends upon power to store information, such as various types of dynamic random access memory (DRAM), among others. Non-volatile memory can include memory that does not depend upon power to store information. The memory resource 356 can be integral, or communicatively coupled, to a machine, in a wired and/or a wireless manner. For example, the memory resource 356 can be an internal memory, a portable memory, a portable disk, or a memory associated with another machine (e.g., enabling MRIs to be transferred and/or executed across a network such as the Internet).

The memory resource 356 can be in communication with the processing resource 352 via a communication path 354. The communication path 354 can be local or remote to a machine (e.g., a computing device) associated with the processing resource 352. Examples of a local communication path 354 can include an electronic bus internal to a machine (e.g., a computing device) where the memory resource 356 is one of volatile, non-volatile, fixed, and/or removable storage medium in communication with the processing resource 352 via the electronic bus.

The program instructions (e.g., machine-readable instructions (MRI)) can include instructions stored on the memory resource 356 and executable by the processing resource 352 to implement a desired function (e.g., receive data indicating a topological dependency of each of the plurality of CIs, etc.). The MRI can also be stored in remote memory managed by a server and represent an installation package that can be downloaded, installed, and executed. The MRI can include a number of modules 358, 360, 362, 364, and 366. The number of modules 358, 360, 362, 364, and 366 can include MRI that when executed by the processing resource 352 can perform a number of functions.

The number of modules 358, 360, 362, 364, and 366 can be sub-modules of other modules. For example, the determine end event module 360 and the synchronize module 362 can be sub-modules and/or contained within the same computing device. In another example, the number of modules 358, 360, 362, 364, and 366 can comprise individual modules at separate and distinct locations (e.g., machine-readable medium, etc.).

The number of modules 358, 360, 362, 364, and 366 in some examples, can be executed by a number of engines. Each of the engines can include hardware or a combination of hardware and programming instructions (e.g., MRI) designated or designed to execute a module (e.g., a particular module). The MRI can, in some examples, include and/or be analogous to the modules 358, 360, 362, 364, and 366. For instance, the programming instructions may be MRI stored on a tangible, non-transitory machine readable medium (e.g., memory resource 356) and the hardware may include a processing resource (e.g., processing resource 352) for executing those instructions. The processing resource can include one or multiple processors. Such multiple processors may be integrated in a single device or distributed across devices. Furthermore, the machine readable medium may be integrated in the same device as the processing resource or it may be separate and accessible to that device and the processing resource.

In some examples, the number of modules 358, 360, 362, 364, and 366 can include logic. As used herein, "logic" can include hardware (e.g., various forms of transistor logic, application specific integrated circuits (ASICs), etc.), as opposed to machine executable instructions (e.g., software, firmware, etc.) stored in memory and executable by a processing resource.

A receive module 358 can include MRI that when executed by the processing resource 352 can perform a number of receive functions. The receive module 358 can receive data indicating a plurality of reported events each associated with a respective number of CIs of a plurality of CIs. For instance, data indicating a reported event (e.g., a service interrupt) and a CI associated therewith (e.g., a CI that triggered the event). The receive module receive module 358 can receive data indicating a topological dependency of each of the plurality of CIs. For instance, a topological dependency of a CI associated with a reported event. In some examples, the receive module 358 can be implemented by a receive engine (not shown).

An assign module 360 can include MRI that when executed by the processing resource 352 can perform a number of assign functions. The assign module 360 can assign a weight to each of the respective number of CIs and/or CIs of the plurality of CIs having a topological dependency therefrom. For instance, the assign module 360 can assign a respective weight that can be calculated as a product of a coverage factor and a confidence factor, as described herein. The respective weight can be assigned by the assign module 360 to each of the respective number of CIs and CIs of the plurality of CIs having a topological dependency therefrom. The assigned weight can be stored in a database (e.g., a uCMDB database) to promote determining hotspots using stored data.

A determine module 362 can include MRI that when executed by the processing resource 352 can perform a number of determine functions. The synchronize module 362 can determine a plurality of potential hotspots common to the plurality of reported events. For instance, each of the plurality of potential hotspots can be determined to have an assigned weight associated therewith that is a local maximum with respect to adjacent CIs determined using a graph (e.g., an acyclic graph) representing the topological dependencies of the plurality of CIs.

In various examples, the computing system 350 can include an identify module 364. An identify module 364 can include MRI that when executed by the processing resource 352 can perform a number of executing script functions. The identify module 364 can identify a hotspot as one of the plurality of potential hotspots having a weight assigned thereto that satisfies (e.g., exceeds) a hotspot weight threshold. For example, the hotspot weight threshold can be a numeric threshold such as 0.6, among other suitable numeric thresholds. The hotspot weight threshold can be a predetermined hotspot weight threshold (e.g., determined prior to the receive module 358 receiving data) and/or a dynamic hotspot weight threshold (e.g., determined subsequent to the receive module 358 receiving data). For instance, in some examples, the identify module 364 can identify the hotspot without use of data obtained subsequent to the reported events (e.g., without comparing the reported event to a current monitored status of a CI). However, the identify module 364 can identify a plurality of hotspots from the plurality of potential hotspots in the event that two or more CIs of the plurality of potential hotspots satisfy (e.g., exceed) the hotspot threshold.

In some examples, the identify module 364 can include MRI that when executed by the processing resource 352 can identify the hotspot without use of data obtained subsequent to the reported events. Such identification can reduce and/or eliminate comparison of information of the stored data with a current monitored state of a CI of the plurality of CIs.

In various examples, the computing system 350 can include a display module 366. A display module 366 can include MRI that when executed by the processing resource 352 can perform a number of display functions. The display module 366 can cause a display of the identified hotspot. Causing can include executing instructions stored in memory to directly cause a user device to display the detected hotspot and/or to communicate data with an expectation that it be processed by another device to cause the user device to display the detected hotspot. In some examples, the instructions to cause the display includes instructions executable by the processor to cause the display of an ordered list of a plurality of hotspots each having a weight associated therewith satisfying the hotspot weight threshold. For instance, such a display can include displaying an order list of the plurality of hotspots ranked in order (e.g., from high to low) of weight.

The user device, as used herein, can include a user interface where interactions between a user (e.g., a client) and a machine occur (e.g., allows a user to interact with a machine using images and/or text). For example, a selected hotspot can be displayed to promote initiation of remedial measures and/or further investigations to identify and/or confirm a root cause. A user interface can include hardware components and/or machine-readable instruction components. For instance, hardware components can include input components (e.g., a mouse, a touch screen, and a keyboard) and output components for the computing device to indicate the effects of user input (e.g., display). An example user interface can include a graphical user interface (GUI). A GUI can, for example, represent actions and tasks available to a user through graphical icons and visual indicators.

Such a display (e.g., display of a graphical representation of a hotspot) can enable support personnel (e.g., a user and/or a IT administrator) to select a hotspot of the plurality of identified hotspots for remediation measures. The remediation measures can be automatically initiated, for example, each of the identified hotspots can be have remediation measures performed thereon. Remediation measures can include substitution and/or repair of the identified hotspot. For instance, an identified hotspot (e.g., a rack of a server) could be removed and substituted with a similar rack.

Another CI having a similar capability could be brought on-line to perform functions previously associated with the identified hotspot (e.g., storage of data). For instance, in some examples, the plurality of CIs (e.g., virtual resources) can be located in a cloud system. Cloud systems can include a public cloud, a private cloud, and/or a hybrid cloud, among other cloud types. A public cloud system can include a service provider that makes resources (e.g., applications and storage), available to the public over the Internet. A private cloud system can include a computing architecture that provides hosted services to a limited number of the plurality of CIs (e.g., computer), for example, CIs behind a firewall. A hybrid cloud system can include a private cloud system bound together with a public cloud system. In such a cloud system, a virtual resource (e.g., a virtual machine) identified as a hotspot can be readily substituted with another virtual resource that performs the functions of the virtual machine identified as a hotspot.

In some examples, the instructions to perform remediation measures to the identified hotspot can include to identify and/or confirm a root cause of the reported events subsequent to performing remediation measures. Advantageously, such "delayed" root cause analysis can expedite a return to a desired functionality compared to approaches that identify a root cause and subsequently attempt to address the root cause (e.g., by repairing a CI identified as the root cause).

As described herein, the actions, functions, calculations, data manipulations and/or storage, etc., can be performed by execution of non-transitory machine readable instructions stored in a number of memories (e.g., software, firmware, and/or hardware, etc.) of a number of applications. The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for hotspot identification, comprising:
receiving data indicating a plurality of reported events each associated with a respective number of configuration items (CIs) of a plurality of CIs;
receiving data indicating a topological dependency of each of the plurality of CIs;
assigning a weight to each of the respective number of CIs, wherein the weight is a product of a confidence factor and a coverage factor;
assigning a weight to CIs of the plurality of CIs having a topological dependency from the respective number of CIs; and
identifying the hotspot as one of the CIs having a weight assigned thereto that satisfies a hotspot weight threshold.

2. The method of claim 1, wherein the method includes determining a plurality of potential hotspots common to the reported events, and wherein identifying the hotspot includes identifying the hotspot from the potential hotspots.

3. The method of claim 2, wherein the plurality of potential hotspots each has an assigned weight that is a local maximum with respect to assigned weights of adjacent CIs, and wherein the adjacent CIs are CIs one hop from each of the potential hotspots according to the topological dependency.

4. The method of claim 2, wherein identifying the hotspot from the potential hotspots common to the reported events begins with a potential hotspot of the potential hotspots having comparatively less CIs depending therefrom with respect to the other potential hotspots.

5. A non-transitory machine-readable medium storing instructions for hotspot identification, executable by a processing resource to cause a computer to:
receive data indicating a plurality of reported events each associated with a respective number of configuration items (CIs) of a plurality of CIs;
receive data indicating a topological dependency of each of the plurality of CIs;
assign a weight to each of the respective number of CIs in response to receipt of the plurality of reported events;
assign a weight to CIs of the plurality of CIs having a topological dependency from the respective number of CIs, wherein the weight is a product of a coverage factor and a confidence factor;
determine a plurality of potential hotspots as CIs that are common to the plurality of reported events and each have a weight associated therewith that is a local maximum with respect to adjacent CIs, wherein adjacent CIs are one hop from each other according to the topological dependency; and
identify the hotspot as one of the plurality of potential hotspots having a weight assigned thereto that satisfies a hotspot weight threshold.

6. The medium of claim 5, wherein the instructions to determine the potential hotspots include instructions executable by the processor to utilize the topological dependency to determine the potential hotspots common to the reported events.

7. The medium of claim 5, wherein the instructions to determine the potential hotspots include instructions executable by the processor to determine the potential hotspots based upon stored data associated with the plurality of CIs.

8. The medium of claim 5, wherein the confidence factor is a function of a total number of the reported events that are impacted by the given CI and a total number of closures of the reported events that depend upon the given CI.

9. A system for hotspot identification, the system comprising a processing resource in communication with a non-transitory computer readable medium, wherein the non-transitory computer readable medium contains a set of instructions and wherein the processing resource is designed to carry out the set of instructions to:
receive data indicating a plurality of reported events each associated with a respective number of configuration items (CIs) of a plurality of CIs;
receive data indicating a topological dependency of each of the plurality of CIs;

calculate a respective weight as a product of a coverage factor and a confidence factor to assign to each of the respective number of CIs and CIs of the plurality of CIs having a topological dependency therefrom;

determine a plurality of potential hotspots that are common to the plurality of reported events, each of the plurality of potential hotspots having an assigned weight associated therewith that is a local maximum with respect to adjacent CIs determined using a graph representing the topological dependencies of the plurality of CIs;

identify the hotspot as one of the plurality of potential hotspots having a weight assigned thereto that satisfies a hotspot weight threshold; and cause a display of the identified hotspot.

10. The system of claim 9, wherein the instructions executable by the processing resource include instructions executable by the processing resource to perform remediation measures to the identified hotspot.

11. The system of claim 10, wherein the instructions to perform remediation measures include instructions executable by the processing resource to confirm a root cause of the reported events subsequent to performing remediation measures.

12. The system of claim 9, wherein the instructions to cause the display include instructions executable by the processor to cause the display of an ordered list of a plurality of hotspots each having a weight associated therewith satisfying the hotspot weight threshold.

* * * * *